Figure 1:
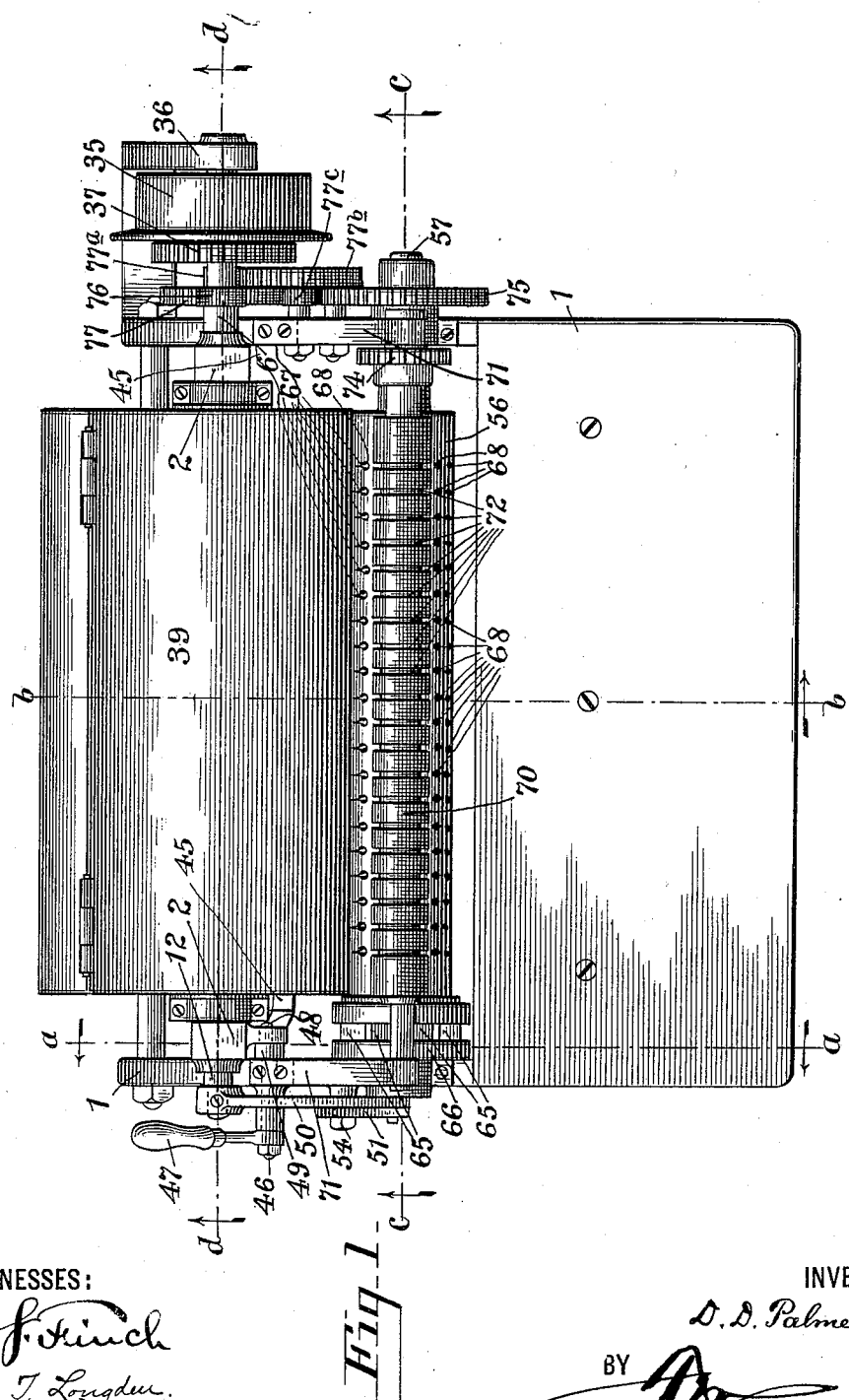

No. 614,408. Patented Nov. 15, 1898.
D. D. PALMER.
FUR PLUCKING MACHINE.
(Application filed Nov. 18, 1897.)

(No Model.) 7 Sheets—Sheet 1.

WITNESSES:
J. F. Finch
M. T. Longden.

INVENTOR
D. D. Palmer
BY
ATTORNEY

No. 614,408.  
D. D. PALMER.  
FUR PLUCKING MACHINE.  
(Application filed Nov. 18, 1897.)  
Patented Nov. 15, 1898.

(No Model.)

7 Sheets—Sheet 2.

WITNESSES:  
J. F. Finch.  
M. J. Longden.

INVENTOR  
D. D. Palmer  
BY  
ATTORNEY

No. 614,408. Patented Nov. 15, 1898.
D. D. PALMER.
FUR PLUCKING MACHINE.
(Application filed Nov. 18, 1897.)
(No Model.) 7 Sheets—Sheet 3.
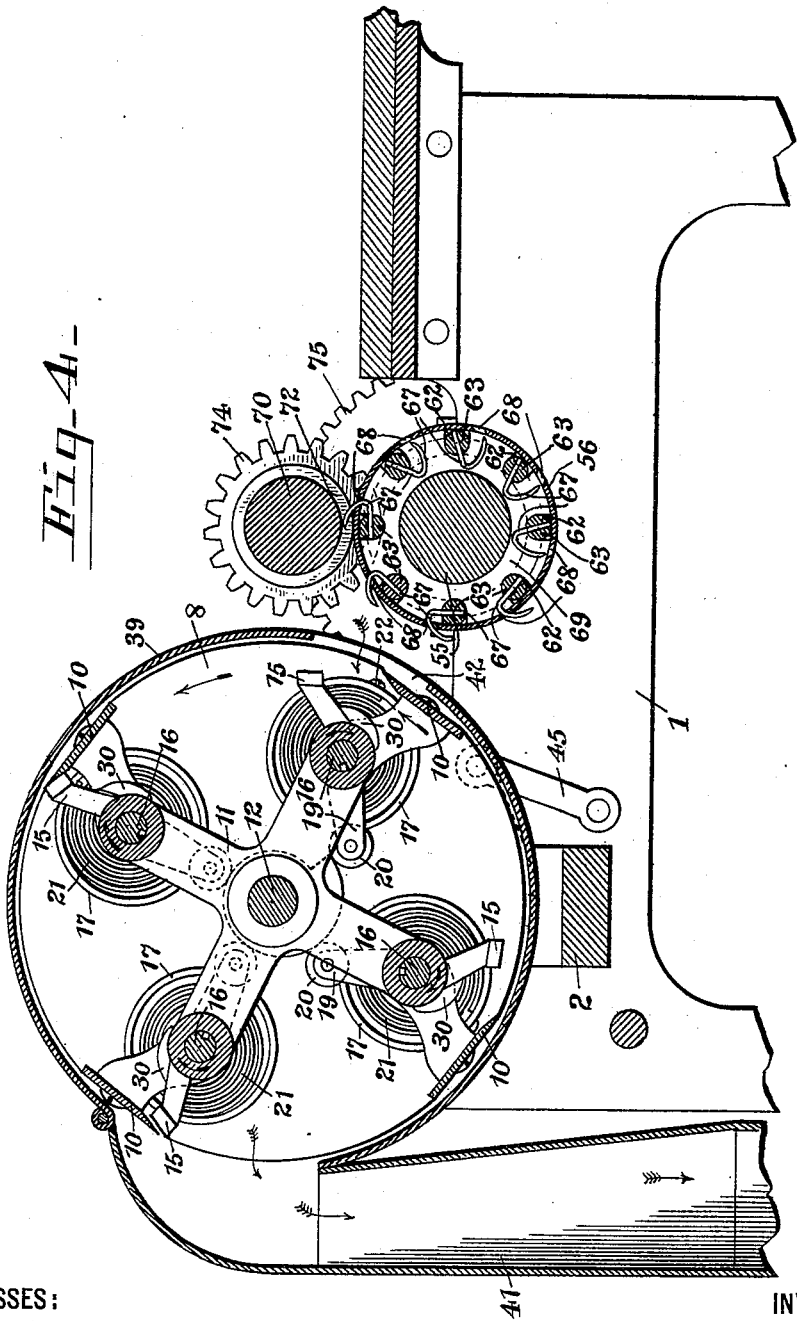
WITNESSES:
INVENTOR
D. D. Palmer
BY
ATTORNEY

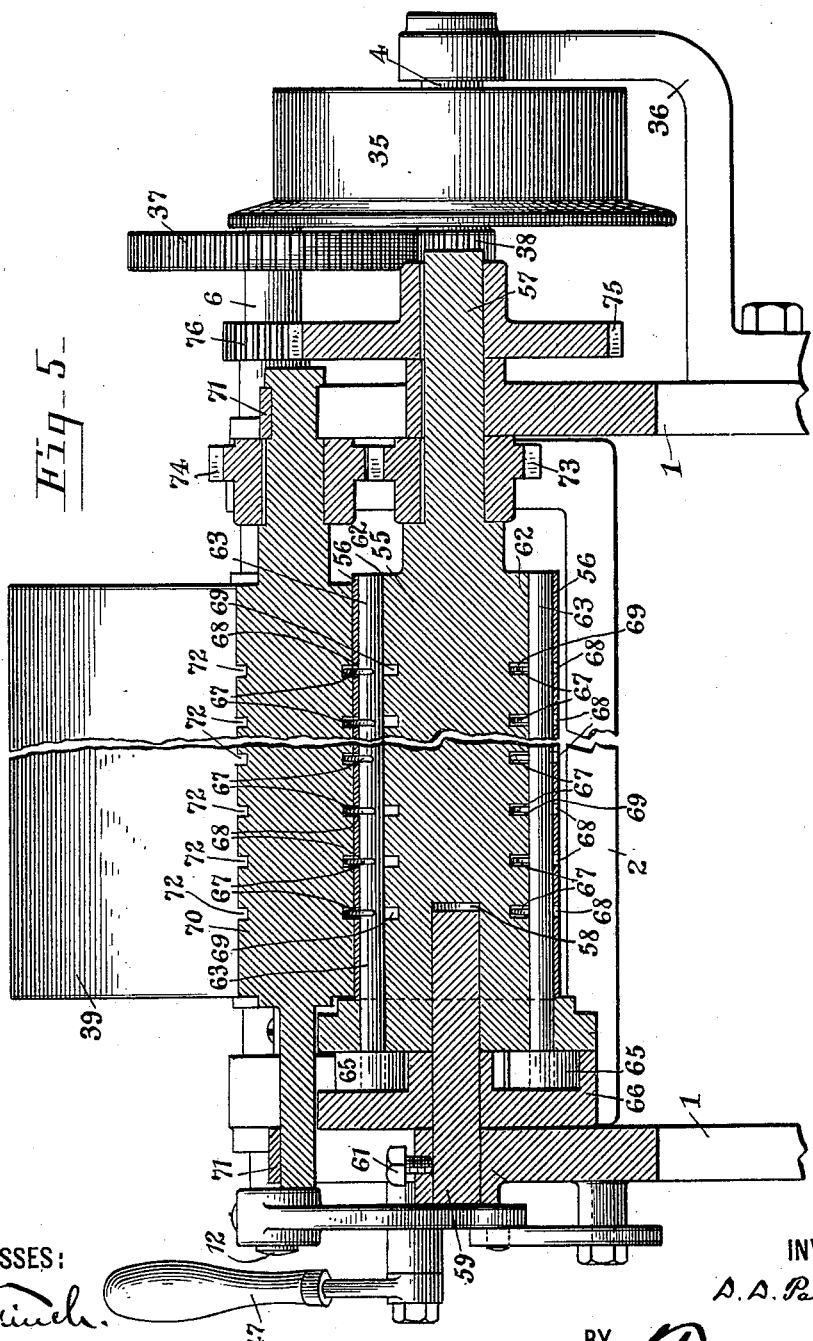

No. 614,408. Patented Nov. 15, 1898.
D. D. PALMER.
FUR PLUCKING MACHINE.
(Application filed Nov. 18, 1897.)
(No Model.) 7 Sheets—Sheet 5.
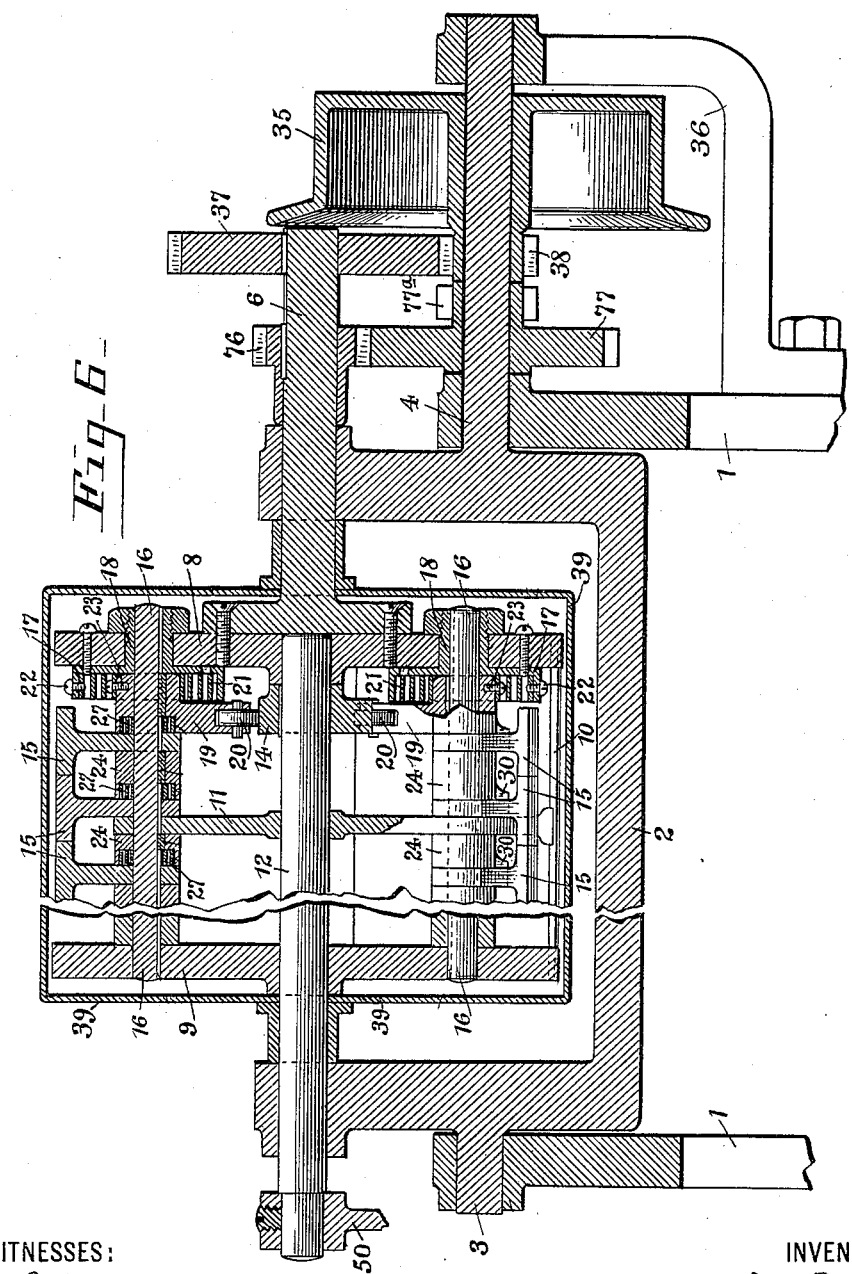
WITNESSES: INVENTOR
D. D. Palmer
BY
ATTORNEY No. 614,408. Patented Nov. 15, 1898.
D. D. PALMER.
FUR PLUCKING MACHINE.
(Application filed Nov. 18, 1897.)
(No Model.) 7 Sheets—Sheet 6.
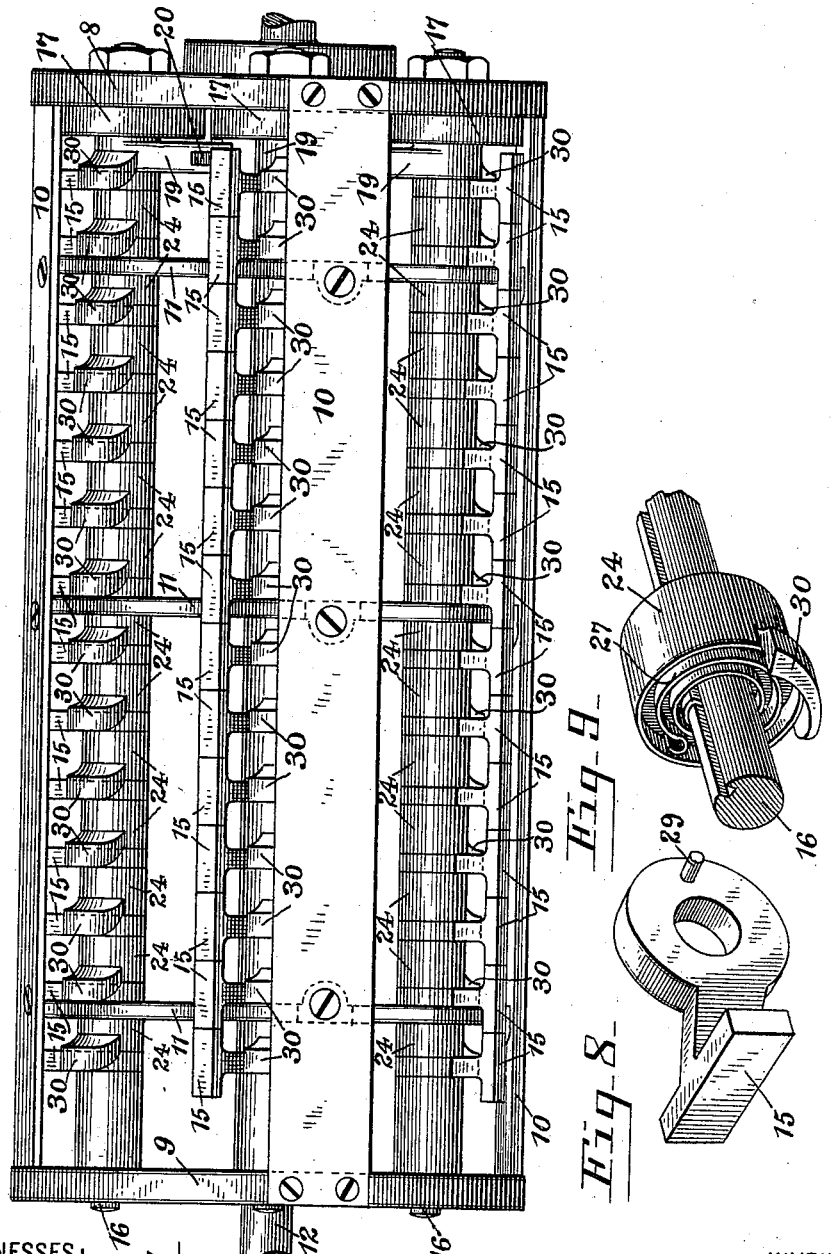
WITNESSES:
J. H. Finch
M. T. Longden
INVENTOR
D. D. Palmer
BY 
ATTORNEY
THE NORRIS PETERS CO., PHOTO-LITHO., WASHINGTON, D. C.

No. 614,408. Patented Nov. 15, 1898.
D. D. PALMER.
FUR PLUCKING MACHINE.
(Application filed Nov. 18, 1897.)
(No Model.) 7 Sheets—Sheet 7.
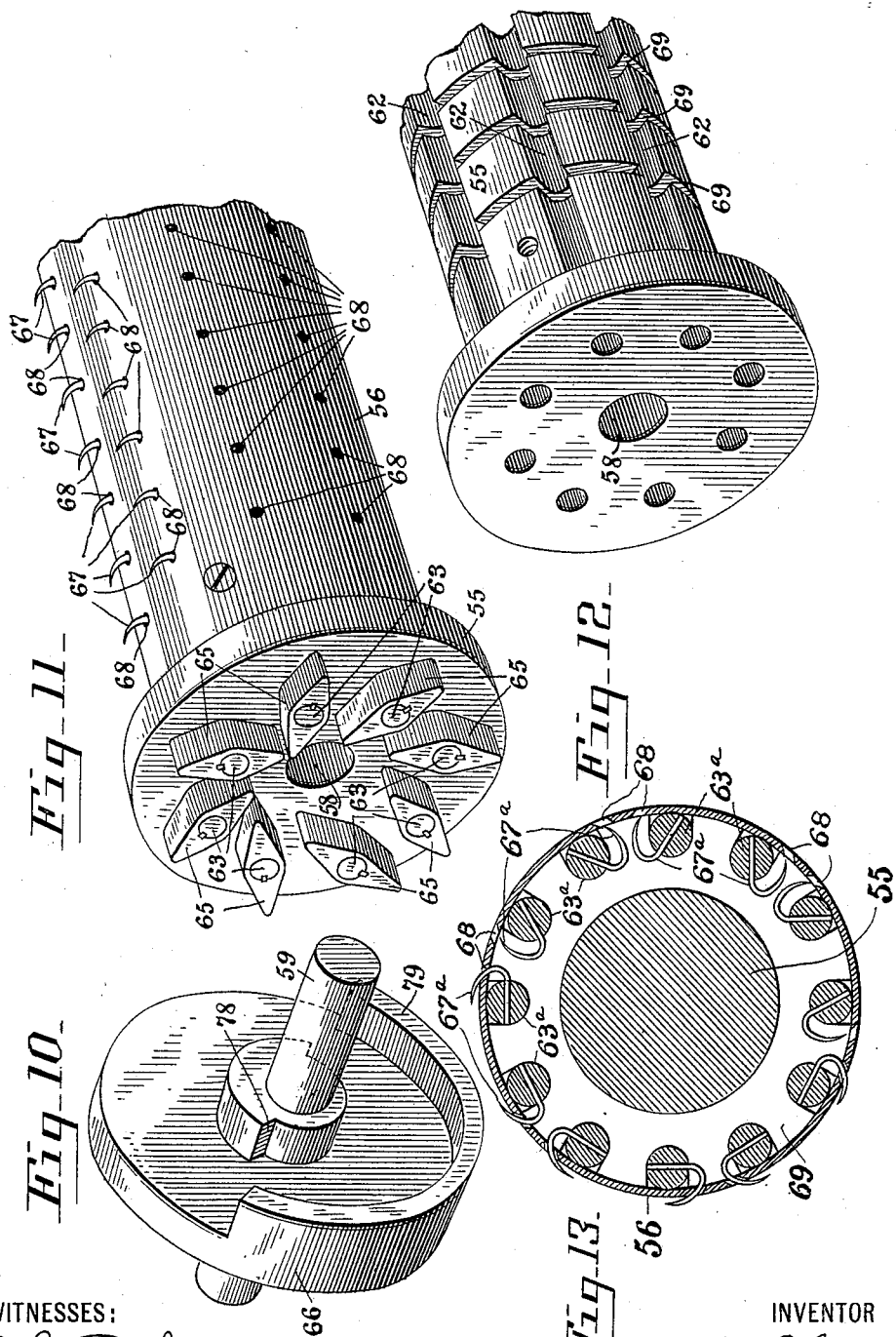

UNITED STATES PATENT OFFICE.

DOLPHAS D. PALMER, OF WORCESTER, MASSACHUSETTS, ASSIGNOR TO JOSEPH J. ASCH, OF SOUTH NORWALK, CONNECTICUT.

FUR-PLUCKING MACHINE.

SPECIFICATION forming part of Letters Patent No. 614,408, dated November 15, 1898.

Application filed November 18, 1897. Serial No. 658,930. (No model.)

*To all whom it may concern:*

Be it known that I, DOLPHAS D. PALMER, a citizen of the United States, residing at Worcester, in the county of Worcester and State of Massachusetts, have invented certain new and useful Improvements in Fur-Plucking Machines; and I do hereby declare the following to be a full, clear, and exact description of the invention, such as will enable others skilled in the art to which it appertains to make and use the same.

My invention has reference to certain new and useful improvements in automatically-operated machines for plucking the hairs from fur-pelts, and has for its object to so construct and operate the gripping devices that there can be no rebound or recovery thereof which would tend to release the hairs before plucking, while at the same time, owing to this positive gripping of the hairs, the capacity of the machine as well as the efficiency is vastly increased.

Various machines have been devised for removing hairs from pelts, which machines may be classed under the following heads: those which employ a blast sufficient only to blow the soft fur away from the gripping devices, those which employ an exhaust to draw the long hairs within the field of the gripping devices, those which employ gripping devices which simply pinch the hairs in a given plane, and those which employ gripping devices which in the act of pinching the hairs bend them around some angular element.

My present improvement relates to that class of such machines employing an exhaust to draw the long hairs within the field of the gripping devices and utilizing grippers to deflect the hairs around an angular element during the act of gripping.

None of the machines heretofore contrived possess commercial utility to the extent that they have supplanted the hand plucking process, and this is due solely to the fact that the gripping devices fail to pinch the hairs firmly, so that they can be withdrawn from the pelt without injuring the same, or else because in the endeavor to overcome this defect the gripping devices are so constructed that they bite off the hairs and gouge the fur, thus causing the pelt to present a ragged and shingled appearance and rendering the fur of decreased commercial value.

Gripping devices that are positively operated so as to pinch the hairs with an unyielding pressure have been discarded as impractical, in that such devices always operate uniformly as far as the degree of pinching is concerned, so that if such devices are properly set for comparatively fine hairs the coarser hairs will be crushed and bitten off by the excess of pressure, and if, on the other hand, such devices are adjusted to properly pinch the coarser hairs the finer hairs will not be gripped with sufficient pressure to pull them from the pelt. It is therefore highly desirable that one or both of the gripping-jaws should be capable of a resilient recovery, so that both the fine and coarse hairs may be properly gripped.

In all constructions heretofore that have employed resilient gripping devices the resilient gripping element has been so constructed and operated as to pinch the hairs after the manner of a pair of pincers; but it is a well-known fact that as soon as the hairs are initially gripped by such devices there will be a slight recovery of the resilient gripping element, which is sufficient to either release the hairs entirely or to effect the final gripping at a point so near the extremities of the hairs that the latter will merely be bitten off.

In my improvement the gripping devices come together upon the hairs with a wedging action which is sufficient to successfully resist the tendency of the spring element to cause a recovery, while at the same time the resilient gripping-jaw readily yields to accommodate hairs of different thicknesses. The distention of the gripping devices is accomplished by means of positively-acting devices, so that it will be clear that the wedging together of the gripping devices will effect not the slightest disadvantage. By the use of my improvement a pelt when once gone over is thoroughly freed from these hairs and the plucking operation is accomplished with great rapidity, since I am enabled to use gangs of plucking or gripping devices which are continuously carried by a rapidly-revolving element. Moreover, the devices which I employ for feeding and properly delivering the pelts to the plucking devices are not only novel, but greatly contribute toward the capacity of my machine as well as to its commercial value.

Figure 2:
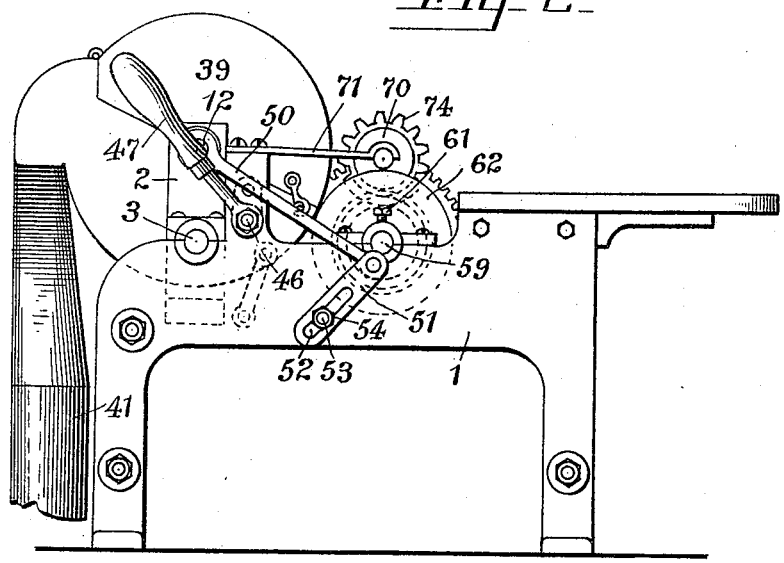
Figure 3:
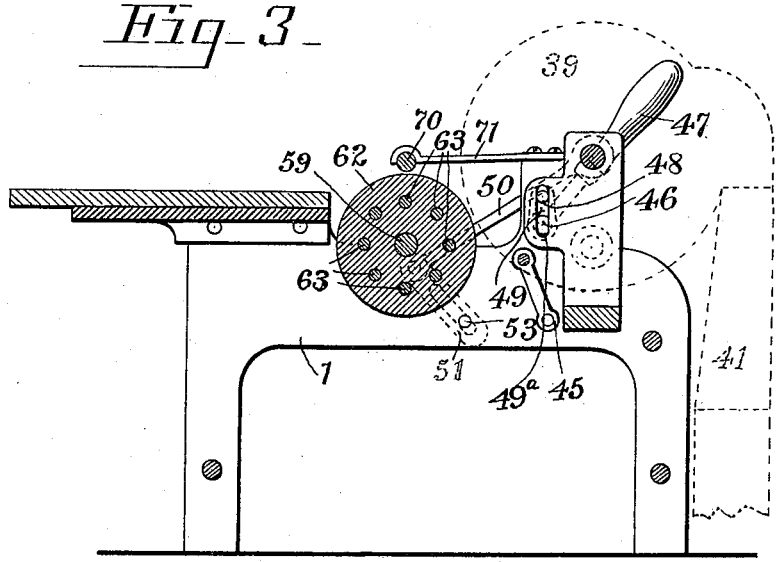

In the accompanying drawings, which form a part of this application, Figure 1 is a plan view of my improved machine; Fig. 2, an end elevation; Fig. 3, a section at the line *a a* of Fig. 1; Fig. 4, a section at the line *b b* of Fig. 1; Fig. 5, a section at the line *c c* of Fig. 1; Fig. 6, a section at the line *d d* of Fig. 1; Fig. 7, a detail elevation of the rotary plucking-head. Figs. 8 and 9 are detail perspectives, showing, respectively, complementary parts of the resilient gripping-jaw; Fig. 10, a detail perspective of the cam which operates the spurs of the feed-roll; Fig. 11, a detail perspective showing the feed-roll partly broken away. Fig. 12 is a detail perspective of said roll broken away and with the spurs, oscillating rods, and the inclosing perforated tube removed; and Fig. 13, a detail sectional elevation of the feed-roll, showing a modified construction and arrangement of the spurs.

Similar numerals of reference denote like parts in the several figures of the drawings.

Referring to Fig. 6, 1 is the frame of the machine, to which is pivoted a yoke 2 by means of trunnions 3 4, projecting at opposite sides of said yoke. This yoke carries the plucking mechanism and is capable of swinging freely in its bearings for the purpose presently to be described.

6 is a short shaft journaled within the upper portion of one side of the yoke, the inner end of said shaft being rigidly secured to a circular cheek-piece 8, which forms one end of the rotary plucking-head.

12 is a shaft journaled at its inner extremity within the cheek-piece 8, while its outer extremity is journaled within the upper portion of the yoke 2, immediately opposite to the corresponding journal of the shaft 6, and loosely mounted on this shaft 12 is the cheek-piece 9, which forms the other end of the plucking-head.

10 are knife-like strips of metal, four in number, which are secured at their extremities to the peripheries of the cheek-pieces 8 and 9, as shown at Fig. 7, at equidistant points, and these strips constitute the passive or stationary elements against which the respective series of movable jaws are clamped for the purpose of gripping the hairs to be plucked, as will be more fully set forth hereinafter.

Referring to Figs. 4 and 7, 11 are X-shaped braces, preferably three in number, loose around the shaft 12, and to the outer ends of these braces the strips 10 are secured.

It will thus be clear that the plucking-head is supported and driven at one end by the shaft 6, while the opposite end of said head is supported by the shaft 12 in such manner that said head is free to revolve around this shaft 12 independently of the latter.

14 is a cam keyed on the inner end of the shaft 12, the function of which cam is to effect the proper movements of the movable jaws, which grip the hairs preparatory to plucking.

16 are shafts, in the present instance four in number, which extend between the cheek-pieces 8 9, the journals at one end being within the cheek-piece 9, while at the other ends these shafts are journaled within the hubs 18 of the boxes 17, which hubs are in turn journaled within the cheek-piece 8. These shafts 16 also pass freely through the braces 11 merely for the purpose of affording additional strength. There are four sets of movable or clamping jaws 15, which are respectively hung around these shafts 16, so as to be capable of a free swinging movement, each set coöperating with one of the strips 10, and, furthermore, each of these sets of clamping-jaws is operated and controlled by instrumentalities mounted on these respective shafts and primarily actuated independently of each other by the cam 14, as will be clear from the description, to which attention is now invited.

19 are cranks keyed to the shafts 16 and carrying at their free ends friction-rolls 20, which bear upon the periphery of the cam 14. Within each one of the boxes 17 is a volute spring 21, one end of which is secured to said box by screw 22, while the other end is secured to the crank 19 by screw 23, so that it will be clear that the revolution of said cam will effect rocking movements of the shafts 16, the movements in one direction being of course effected positively by the cam, while the movements in the other direction are due to the recovery of the spring 21. Referring particularly to Fig. 4, where the contour of this cam is shown partly in solid and partly in dotted lines, it will be evident that when the cam is operating against the levers 19 at its longest radius these shafts 16 will be positively rocked in one direction and that just as soon as the cam passes these levers the latter will be returned by the spring 21 to rock these shafts in the opposite direction. These rocking motions of the shafts 16 are utilized to effect the proper movements of the movable or gripping jaws, and I will now describe the devices which are carried by these shafts and are connected to these jaws, whereby the latter may properly perform their functions.

24 are boxes keyed on the shafts 16, and within each box is a volute spring 27, one end of which is secured to the shaft 16, while the other end is attached to a pin 29, which projects laterally from the heel end of each jaw 15, as will be clearly understood by reference to Figs. 6, 8, and 9. These springs 27 are normally wound to any desired degree, and secured around the peripheries of boxes 24 are lugs 30, which are normally in abutment with the jaws 15, so that when the shafts 16 are initially rocked in one direction these boxes and jaws will move in harmony without affecting said springs, and it will thus be clear that the tendency of these springs when these boxes are returned by the reverse rocking movements of said shafts is to throw the extremities of said jaws toward the strips 10. If said jaws and boxes were rigid with the shafts, it would of course be clear that the return rocking movements of the latter would likewise throw these jaws toward the strips 10; but in such instance all the jaws of one set on a shaft 16 would be actuated by a common agent—namely, the recovery of the spring 21—and therefore all the jaws of each set would be capable of clamping to the same degree—that is to say, if each set of jaws were operated against hairs of different thicknesses some of the hairs might be properly clamped, while others would certainly pull loose from the jaws. The function of these springs 27 is to impart an independent clamping action to each jaw, for they can all yield independently to the resistance afforded by hairs of various sizes. Moreover, the action of the springs 21 in their recovery throws the shafts 16 so far that the lugs 30 are carried away from the jaws 15, thus enabling the springs 27 to exert both an increased and an independent pressure upon the jaws 15, for it will be clear that this overthrow of the boxes will tend to wind these springs 27 still tighter. It will accordingly be clear that there can be no rebound of these jaws after the initial impact thereof against the stationary strips 10, since this tendency to rebound is nullified by the overthrow of the boxes.

The jaws 15 may be faced with a block of rubber, felt, or other yielding material, if desired, in order to afford a softer or more flexible gripping-surface; but of course this is a matter to be determined by the demands of the occasion and relates merely to construction and has nothing to do with my invention.

For convenience in construction I have made one of the boxes 24 integral with each of the cranks 19, and this, in effect, is the same as if the cranks were entirely separated, because it must be remembered that the cranks and the boxes are all keyed in separate sets upon the shafts 16.

The trunnion 4 is elongated, as shown at Fig. 6, and loosely mounted thereon is the power-pulley 35.

36 is a bracket bolted to the frame of the machine and which forms a bearing for the outer end of the trunnion 4.

Motion is imparted to the plucking-head through the gear-wheel 37, keyed on the end of the shaft 6 and meshing with a pinion 38, rigid with the hub of the power-pulley.

39 is a drum, which is supported at its sides upon the shafts 6 and 12, said drum surrounding and inclosing the plucking-head and made in two sections hinged together for convenience in inspecting the operation of said head. Communicating with this drum, at the rear thereof, is an exhaust 41, through which air is drawn in the direction of the arrows for the purpose of bringing the hairs within the operative field of the jaws in the manner which I will now explain.

In the front of the drum and extending throughout its width is an opening 42, and in close proximity thereto are the instrumentalities which carry and feed the skins to be plucked in such manner that the fur side of such skins is close to this opening and within the influence of the exhaust. The hairs will be drawn inwardly through this opening, so as to be within the field of the clamping-jaws as the plucking-head revolves, and these hairs will be gripped firmly by the jaws 15 against the strips 10, the contiguous surfaces of these jaws and strips being correspondingly beveled, so that the hairs will be firmly wedged when clamped, whereby during the continued rotation of the plucking-head said hairs will be deflected around the edges of the strips and withdrawn without a possibility of becoming free from the jaws. This clamping action of the jaws is brought about in the manner hereinbefore set forth, and it will therefore be clear that during the continued movement of the plucking-head around the cam 14 after hairs have been plucked said jaws 15 will be opened, thus permitting the hairs to be withdrawn by the exhaust out through the pipe 41.

Particular attention is called to the fact that, as before noted, every jaw 15 is capable of an independent gripping action, and also it is important to note particularly that the hairs are not gripped by the jaws after the manner of ordinary pincers, but are firmly wedged between the beveled faces of the clamping elements, so that the complete withdrawal of the hairs from the skin is insured, and in these respects my improvement possesses great advantage and merit in that it effectually follows the most approved method of plucking such hairs from skins by hand, and this has never heretofore been accomplished.

By reference to Figs. 6 and 7 it will be seen that the outer extremities of all the jaws of one set are so disposed with respect to each other that no spaces are left between them within which hairs might lodge and escape plucking.

By reason of the fact that all the jaws 15 are operated independently I am enabled to make them quite narrow, so that each set is composed of very many of these jaws, and therefore in plucking a skin practically no hairs can escape the efficient action of these jaws, for the reason that the number of hairs grasped by any one jaw is reduced to a minimum.

In my improvement I employ certain mechanism for positively holding the pelts and releasing them at the proper times, so that the entire skin may be passed within the field of the plucking devices without the slightest pressure upon the fur or hair save at the point where the skin is initially grasped by the feed-roll and without the use of any auxiliary devices for holding the skin during the initial or the final plucking at the ends thereof, which part of my improvement I will now describe.

Referring especially to Figs. 1, 3, 4, 5, 10, 11, and 12, 55 is a feed-roll one end of which is formed into a shaft 57, which is journaled within the frame 1, the other end of said roll being provided with a socket 58, into which projects a short shaft 59, which latter is secured to the frame as against rotation by set-screw 61. This feed-roll has in its periphery a series of longitudinal parallel grooves 62, within which lie rock-shafts 63, these shafts at one end being extended through the head of the roll and provided beyond the latter with rigid dogs 65.

66 is a double cam which is rigidly secured upon the stationary shaft 59, one part of the cam being surrounded by the inner ends of the dogs 65, while the outer or rim portion of the cam incloses the outer ends of these dogs. The inner cam is concentric with the shaft 59; but the radius of one-half of this cam is greater than the radius of the other half, while the outer or rim cam is also concentric with this shaft, but is semicircular. As the feed-roll revolves the dogs will be carried against the shoulder 78 of the inner cam, thereby rocking the shafts 63 as fast as their respective dogs are operated upon by said shoulder, and when these dogs strike against the shoulder 79 of the rim portion of the cam said dogs and their corresponding shafts will be rocked in the reverse direction, all as will be presently explained and as will be clearly apparent by reference to Figs. 10 and 11. In the construction as shown in the drawings it will be seen that that portion of the inner cam whose surface is described from the larger radius is sufficient to operate against four of these dogs at one time, while the remaining portion of this inner cam in conjunction with the rim portion of the cam confines the rest of the dogs, so that they cannot become displaced by any jar and will be in proper position for performing their functions when they abut against the shoulder 78.

56 is a sheet-metal cylinder which incloses the feed-roll and is secured to the same by screws or otherwise and serves to keep the rock-shafts 63 in proper position. The rock-shafts 63 are at suitable intervals throughout their length provided with spurs 67, which in their effective positions project through perforations 68 in the cylinders 56. The feed-roll 55 is provided with annular grooves 69 in order to give sufficient clearance-spaces for the movements of these spurs when the shafts 63 are rocked by the cam 66, hereinbefore set forth.

70 is a roll which rests immediately on top of the feed-roll 55 and is kept in position by means of spring-arms 71, which are secured at one end of the frame and at the other end bear down against this roll 70, so that it will be clear that the latter is capable of a resilient movement away from the feed-roll. This roll 70 has in its periphery annular grooves 72, which coincide with the perforations 68 in the cylinder 66 and the grooves 69 in the feed-roll, so that when the spurs 67 are projected they will meet with no obstruction from this roll 70.

73 74 are meshing gears, which are respectively carried by the rolls 55 70, whereby rotary motion will be imparted to the latter from the former.

75 is a gear keyed on the shaft 57, and 76 is a gear keyed on the shaft 6 of the plucking-head, and the desired speed is given to the feed-roll 55 by means of a train of speed-gears intermediate of the gears 75 76. Since these speed-gears are very ordinary and form no part of my invention, I have not illustrated them clearly, although they all appear, with but one exception, in plan view at Fig. 1. It is therefore deemed sufficient to state that the gear 76 meshes with the idle-gear 77, (see Figs. 1 and 6,) the hub of the latter being formed into a pinion $77^a$, which meshes with an idle-gear $77^b$, the latter carrying the pinion $77^c$, which meshes with an idle-pinion, (not shown,) which last-mentioned pinion meshes with the gear 75.

The object of the speed-gearing is to greatly reduce the motion of the feed-roll, and in the present instance the plucking-head would be revolved seventy-two times during a single revolution of the roll, and this of course insures the thorough plucking of the skin.

It will be observed that the roll 70 is somewhat smaller in diameter than the feed-roll 55, but that the intermeshing gears 73 74 are of the same diameter, and the object of this relative size of these rolls is to cause the periphery of the roll 70 to travel slower than the periphery of the roll 55, so that there will be a dragging action against the pelt as it passes between these rolls. This dragging action insures the effective projection of the spurs through the pelt, so as to hold the latter firmly, and also causes the pelt to be tightly stretched around the feed-roll between the points where the spurs grasp the same. This stretching of the pelt around the feed-roll throughout the given area of the latter is quite an important feature, since it causes the hairs to stand out from the pelt, and is, moreover, a vast improvement over the method employed of dragging the skin around a knife-edge.

Of course it will be understood that the construction and arrangement of the spurs 67 are immaterial so long as these spurs are operated to properly hold the pelt, and accordingly such spurs may be arranged to penetrate the pelt and extend toward each other in pairs. I have therefore shown at Fig. 13 a modification in which rock-shafts $63^a$ are arranged in couplets, the shafts of each couplet carrying spurs $67^a$, which are extended in opposite directions when the shafts are operated in the manner hereinbefore set forth. This construction shown at Fig. 13 will of course prevent the pelt from slipping in either direction upon the feed-roll; but the construction shown in Fig. 11 has proved very practical, and since the construction and arrangement of these spurs are mere matters of detail, involving the most ordinary skill of the workman, I do not wish to be limited in this respect.

Some pelts are thicker than others, and also the hairs are not always of the same length in different parts of the same pelt, and therefore it becomes necessary to provide means for bringing the pelts at certain times nearer to the plucking devices, so that these hairs may come fully within the operative field of such devices. Accordingly I have provided means for bodily adjusting the plucking devices nearer to or farther away from the feed-roll, a description of which I will now give.

Referring particularly to Figs. 1, 2, and 3, 45 is a link whose extremities are pivoted, respectively, to the drum 39 and to the frame. 46 is a short rock-shaft journaled in the frame and having secured to one end an ordinary hand-lever 47, while extending from the other extremity of this shaft is a crank 49, which has a crank-pin 48, which projects within an elongated slot 49ª in the yoke 2, so that it will be clear that when the hand-lever is swung the yoke will be rocked on its trunnions 3 4. In order to permit of these rocking movements of the yoke, there must of course be a yielding on the part of the exhaust-pipe 41, and therefore an ordinary flexible joint may be provided therein, although I have found by experiment that the pipe itself will yield sufficiently to permit of these slight adjustments necessary in moving the plucking devices in proper proximity to different pelts. Although these adjustments are slight and would not materially affect the proper relative location of the opening 42 in the drum with respect to the feed-roll to the extent that the hairs would not be delivered within the field of the plucking devices, nevertheless I deem it advisable to utilize devices which will insure the adjustment of the plucking devices in a straight line, so that the point at which the hairs are delivered to said devices never varies.

Referring to Figs. 2 and 3, it will be clear that when the handle 47 is operated to throw the plucking devices nearer to the feed-roll the drum will be carried in the arc of a circle, owing to the pivotal swinging action of the yoke; but the link 45 will resist this upward throw of the drum and will steady the latter, so that the point at which the hairs are delivered to the plucking devices will not be substantially varied. When the plucking devices are moved away from the feed-roll, this link 45 will of course steady the drum in like manner. Of course these adjustments constitute a minor feature and might be brought about in a variety of ways, all of which involve very ordinary mechanical skill, and I therefore do not wish to be limited in this respect.

Keyed on the shaft 12 is a lever 50, whose lower extremity is pivoted to a link 51, having an elongated slot 52, through which latter passes a stud 53, which is swiveled in the frame of the machine. A nut 54 on the end of this stud serves to secure the link at any desired adjustment within this slot. By releasing the link and throwing the same up or down the shaft 12 will be moved for the purpose of adjusting the cam 14 should it be found necessary to do this in order that the timing of the operation of the jaws 15 may be corrected. When the proper adjustment of this cam is once effected by the movement of this link 51, the nut 54 is operated to secure this link in proper position.

In the operation of my improvement the pelt is simply presented between the rolls 55 70, whereupon it will be drawn between the same and will be grasped by the spurs and tightly stretched by the latter around the feed-roll 55. Should the pelt be uncommonly thick, the roll 70 will readily yield to accommodate the same, and this roll has no contact whatever with the pelt, save at the point where the spurs are to be projected. Therefore the pelt is presented to the plucking devices tightly stretched around the drum and free from all outward pressure. It will thus be seen that not only is the pelt stretched and delivered to the plucking devices, but that the feeding is continuous and automatic and that the entire pelt will be presented to the plucking devices without the intervention of the hand or the employment of any auxiliary devices whatever such as are commonly used in machines at intervals preceding the plucking of the extreme ends of the skin.

By reference to Fig. 4 it will be observed that the roll 55, which carries the spurs, is arranged beneath the roll 70; but of course this arrangement may be reversed and the roll 55 be located above the roll 70, and in the latter instance the operator would be enabled to look directly down upon the fur side of the pelt, and could therefore see at a glance whether the adjustment of the parts were such that the plucking was being performed properly, and I therefore do not wish to be limited in this respect.

I have shown the knife-like strips 10 solid and unyielding, while the jaws are yielding; but of course it will be clear that the strips may be made to yield, while the jaws may be unyielding, or both the jaws and strips may be so constructed as to yield; but matters of this sort are so clearly within the range of ordinary mechanical skill that I do not wish to be circumscribed thereby, all that is necessary in this connection being that one or both of the gripping elements should yield, so that the hairs may be tightly gripped in all instances, it being immaterial whether they are coarse or fine.

Too much stress therefore cannot be laid upon the construction and operation of the plucking devices, for I am the first to provide devices of this sort which, although many in number, operate independently of each other. I therefore do not wish to be limited to the employment of any particular means for feeding or presenting the hairs within the field of the plucking-jaws, although I prefer the construction which I have shown and described. Still my improved plucking devices would operate just as efficiently as far as the proper plucking was concerned if the skin were held with the hairs projected within the field of the plucking devices, and this could be accomplished by bending the skin around an angle-plate, so as to cause the hairs to project, or in any other of the well-known ways.

The exhaust is employed merely as the best method which I am aware of for properly presenting the hairs to the plucking devices, while I prefer to use my improved feed-rolls for the reason that the machine can thereby handle the pelts automatically, and thus greatly increase the efficiency and output of such machine; but, as I before stated, the feed-rolls and exhaust have nothing whatever to do with the actual operation of the plucking devices proper, and I therefore do not wish to be limited in this particular.

Having thus described my invention, what I claim as new, and desire to secure by Letters Patent, is—

1. In a machine for plucking hairs from pelts, the combination of a single rotary head carrying separate sets of independently-operating plucking devices, each set composed of a plurality of independent pluckers, a drum inclosing said head and having a suitably-located opening and communicating with an exhaust, and means for feeding the pelts and for delivering them opposite to said opening within the field of the plucking devices, substantially as set forth.

2. In a machine for plucking hairs from pelts, the combination of a single rotary head carrying separate sets of plucking devices, each set composed of a plurality of independent pluckers, means for operating the plucking devices of each set independently and with a yielding gripping action, and means for feeding the pelts and for delivering the same to said plucking devices, substantially as set forth.

3. In a machine for plucking hairs from pelts, the combination of a single rotary head carrying radially-disposed and separate sets of independently-yielding plucking devices, means for operating the plucking devices of each set independently of each other and independent of the plucking devices of the other set, a drum inclosing said head and provided with a suitably-located opening and communicating with an exhaust, and means for feeding the pelts and for properly delivering them to said plucking devices, substantially as set forth.

4. In a machine for plucking hairs from pelts, the combination of a rotary head carrying separate stationary jaws at suitable intervals in its periphery, clamping-jaws carried by said head in proximity to the stationary jaws, means for operating said clamping-jaws at predetermined times, separate springs connected with each clamping-jaw whereby the gripping action thereof will be rendered independent and resilient, and means for feeding and properly delivering the pelts within the field of said jaws, substantially as set forth.

5. In a machine for plucking hairs from pelts, the combination of the rotary head carrying separate stationary jaws at suitable intervals in its periphery, clamping-jaws carried by said head in proximity to said stationary jaws, means for operating said clamping-jaws at predetermined times, separate springs connected with each clamping-jaw whereby the gripping action thereof will be independent and resilient, a drum inclosing said head and jaws and having a suitably-located opening, an exhaust communicating with said drum, and means for feeding and properly delivering the pelt opposite said opening and within the field of said jaws, substantially as set forth.

6. In a machine for plucking the hairs from pelts, the combination of the rotary plucking-head carrying plucking devices composed of stationary and movable jaws, a spring element for throwing a plurality of the movable jaws into clamping position, means operated by the rotation of said head for positively winding said element and for subsequently releasing the same to effect said clamping movement, and independent spring elements connected with each of the movable jaws whereby the action of the latter is rendered independent and resilient, substantially as set forth.

7. In a machine for plucking hairs from pelts, the combination of a single rotary head carrying stationary jaws having their under or clamping surfaces beveled and independently operating and resilient movable jaws having their outer or clamping surfaces correspondingly beveled whereby the hairs will be clamped with a wedging action and will be drawn out around the edges of the stationary jaws, with means for feeding and properly delivering the pelts within the field of said jaws, substantially as set forth.

8. In a machine for plucking hairs from pelts, the combination of means for feeding and delivering the pelts to the plucking devices, with a rotary plucking-head carrying stationary jaws and having a plurality of rock-shafts journaled therein, a spring element connected to each of said shafts whereby their rocking movements are rendered resilient, separate series of independent jaws pivoted around said shafts, and separate spring elements carried by said shafts and connected with the various pivoted jaws whereby the clamping action of the latter is rendered independent and yielding, substantially as set forth.

9. In a machine for plucking hairs from pelts, the combination of means for feeding and delivering the pelts to the plucking devices, with the rotary plucking-head carrying a plurality of stationary jaws and resilient rock-shafts, a series of independent jaws pivoted around each of said shafts and connected respectively with each pivoted jaw, means for properly feeding and delivering the pelts within the field of the plucking devices, means for revolving the plucking-head, and means for rocking said shafts to and fro at predetermined times whereby the plucking devices are caused to operate, substantially as set forth.

10. In a machine for plucking hairs from pelts, the combination of means for feeding and delivering the pelts to the plucking devices, with the rotary head carrying stationary jaws and having a plurality of rock-shafts journaled therein, a crank keyed to each shaft, a stationary cam against which the free extremities of said cranks impinge, spring elements carried by said head and connected to said cranks whereby the rocking movements of said shafts are made resilient, independent jaws pivoted in series on each of said shafts, and independent springs carried by said shafts and connected with said pivoted jaws whereby the clamping action of the latter is rendered independent and yielding, substantially as set forth.

11. In a machine for plucking hairs from pelts, the combination of a single rotary plucking-head carrying clamping-jaws, means carried by said head and actuated by the rotation of the latter for operating these jaws each with an independent yielding action, and means for properly feeding and delivering the pelts within the field of said clamping-jaws, substantially as set forth.

12. In a machine for plucking hairs from pelts, the combination of means for feeding and delivering the pelts, with the rotary plucking-head carrying stationary jaws and movable clamping-jaws whose clamping ends are in alinement and abut together without intervening spaces, substantially as set forth.

13. In a machine for plucking hairs from pelts, the combination of means for feeding and delivering the pelts to the plucking devices, with a rotary head carrying a corresponding number of stationary jaws and rock-shafts, independent spring elements carried by said head and connected with said rock-shafts, means for rocking said shafts against the resiliency of said springs and for releasing said shafts whereby said springs may effect the return rocking movements, a series of independent jaws pivoted around each of said shafts, and boxes keyed to said shafts and carrying independent springs which have connection respectively with said pivoted jaws whereby the latter may yield independently as they impact against the stationary jaws, substantially as set forth.

14. In a machine for plucking hairs from pelts, the combination of the plucking devices with a feed-roll, instrumentalities carried by the feed-roll and operated by the rotation thereof for automatically grasping the pelts at predetermined points and stretching them around the circumference of said roll with the unplucked fur side outward, and means for revolving the roll whereby the pelts are delivered in stretched condition to the plucking devices, substantially as set forth.

15. In a machine for plucking hairs from pelts, the combination of the plucking devices, the exhaust-drum inclosing the same and having a suitably-located opening, a feed-roll in proximity to said opening, instrumentalities carried by said roll and operated by the rotation thereof for automatically grasping the pelts at predetermined points and stretching them around the circumference of said roll with the unplucked fur side outward, and means for revolving said roll whereby the pelts are delivered in stretched condition with the hairs projecting therefrom through said opening within the field of the plucking devices, substantially as set forth.

16. In a machine for plucking hairs from pelts, the combination of a single rotary plucking-head, gripping-jaws rigid therewith at points around the circumference, independent sets of spring-actuated jaws radially carried by said head, each set composed of a plurality of independent jaws adapted to coöperate with each rigid jaw to grasp the hairs, and means for automatically opening said jaws, substantially as set forth.

17. In a machine for plucking hairs from pelts, the combination of the plucking mechanism with a feed-roll suitably journaled within the frame and carrying instrumentalities for securing the pelt thereon, and devices carried by said roll and automatically actuated by the rotation thereof for operating said instrumentalities whereby when said roll is rotated the pelt will be properly held and presented to the action of said plucking mechanism, substantially as set forth.

18. In a machine for plucking hairs from pelts, the combination of the plucking mechanism with a feed-roll suitably journaled within the frame, instrumentalities carried by said roll for grasping the pelt with the fur side outward at a plurality of points throughout a predetermined area of said pelt, and devices carried by said roll and actuated by the rotation thereof for automatically operating said instrumentalities at predetermined times to hold and release the pelt, substantially as set forth.

19. In a machine for plucking hairs from pelts, the combination of the plucking mechanism with a feed-roll suitably journaled within the frame and carrying hook-shaped spurs, and means carried by said roll and operated by the rotation thereof for automatically projecting and retracting said spurs at predetermined intervals, whereby the pelt is secured around the circumference of said roll and then released, substantially as and for the purpose set forth.

20. In a machine for plucking hairs from pelts, the combination of the plucking mechanism with a feed-roll suitably journaled within the frame and carrying spurs which are adapted to engage the pelt, instrumentalities for projecting and retracting said spurs, and a resilient roll between which latter and said spur-carrying roll the pelt passes, substantially as set forth.

21. In a machine for plucking hairs from pelts, the combination of the plucking mechanism with a feed-roll carrying rows of hook-shaped spurs, means carried by said roll and operated by the rotation thereof for successively projecting said spurs and for holding them in such position throughout a predetermined circumferential area of said roll as said rows successively arrive at a predetermined stationary point during the revolution of said feed-roll, and means likewise carried by said roll and operated by the rotation thereof for retracting said spurs upon their arrival at a second predetermined stationary point and for holding them in this retracted position until the first-mentioned stationary point has again been reached, substantially as set forth.

22. In a machine for plucking hairs from pelts, the combination of the plucking mechanism with a feed-roll suitably journaled within the frame and carrying spurs, means for projecting and retracting said spurs at predetermined intervals through perforations in a drum which incloses said roll, and a resilient roll between which latter and said spur-carrying roll the pelt passes, substantially as set forth.

23. In a machine for plucking hairs from pelts, the combination of the plucking mechanism with a feed-roll suitably journaled within the frame and carrying hook-shaped spurs, means carried by said roll and operated by the rotation thereof for projecting and retracting said spurs with a swinging action at predetermined intervals, and a perforated drum which incloses said roll, whereby when said spurs are retracted said drum will effect the proper stripping of the pelt from the spurs, substantially as set forth.

24. In a machine for plucking hairs from pelts, the combination of the plucking mechanism with a feed-roll suitably journaled within the frame and carrying rock-shafts provided with spurs adapted to be projected and retracted through perforations in a drum inclosing said feed-roll, dogs rigid on the ends of said rock-shafts, and a stationary cam with which said dogs engage to effect the rocking movements of said shafts during the rotation of said feed-roll, substantially as set forth.

25. In a machine for plucking hairs from pelts, the combination of the plucking mechanism with a feed-roll suitably journaled within the frame and carrying rock-shafts provided with spurs adapted to be projected and retracted through perforations in a drum inclosing said feed-roll, the latter being provided with recesses to accommodate the movements of said spurs, dogs rigid on the ends of said rock-shafts, and a stationary cam with which said dogs engage to effect the rocking movements of said rock-shafts during the rotation of said feed-roll, substantially as set forth.

26. In a machine for plucking hairs from pelts, the combination of the plucking mechanism with a feed-roll suitably journaled within the frame and carrying rock-shafts provided with spurs adapted to be projected and retracted through perforations in a drum inclosing said feed-roll, the latter being provided with recesses to accommodate the movements of said spurs, dogs rigid on the ends of said rock-shafts, a stationary cam with which said dogs engage to effect the successive rocking movements of said shafts during the rotation of said feed-roll, a resilient roll between which latter and said feed-roll the pelt passes, said resilient roll being provided with recesses to accommodate the movements of said spurs, and means for revolving said rolls, substantially as set forth.

27. In a machine for plucking hairs from pelts, the combination of the plucking mechanism with a feed-roll provided with rows of spurs, means for projecting and retracting said spurs at predetermined intervals, a resilient roll between which latter and said feed-roll the pelt passes, and means for imparting different speeds to said rolls, whereby the resilient roll is caused to drag against the pelt, substantially as set forth.

28. In a machine for plucking hairs from pelts, the combination of the single rotary head carrying complete sets of independent and automatically-operated plucking devices, of mechanism for feeding and properly presenting the pelts to said plucking-head, and instrumentalities for adjusting said plucking-head with respect to said feeding mechanism, substantially as set forth.

29. In a machine for plucking hairs from pelts, the combination of the rotary plucking-head suitably journaled within a yoke pivoted to the frame, with suitable means for properly presenting the pelt within the operative field of said plucking-head, and a hand-lever whereby said yoke is rocked on its pivots to bring said plucking-head nearer to or farther away from the feeding mechanism, substantially as set forth.

30. In a machine for plucking hairs from pelts, the combination of the rotary plucking-head suitably journaled within a yoke pivoted to the frame, with mechanism for feeding the pelts to said plucking-head, a hand-lever pivoted to the frame, and a crank-pin rigid with said lever and working within a slot in said yoke, whereby said plucking-head may be adjusted with respect to said feeding mechanism, substantially as set forth.

31. In a machine for plucking hairs from pelts, the combination with the rotary plucking-head journaled within a yoke pivoted to the frame, of suitable mechanism for feeding the pelts to said plucking-head, means for adjusting said plucking-head with respect to said feeding mechanism, a casing inclosing said plucking-head and swung around the shafts which support the latter and provided with an opening directly opposite the feeding mechanism, and a link one end of which is pivoted to said drum while the other end is pivoted to the stationary frame, whereby when said drum and plucking-head are adjusted with respect to the feeding mechanism, said link will preserve the proper relative positions of said opening and feeding mechanism, substantially as set forth.

32. In a machine for plucking hairs from pelts, the combination of the rotary plucking-head, the gripping-jaws carried by said head, the cam for opening said jaws, the shaft on which said cam is secured, and means for adjusting said cam, whereby said jaws may be caused to close at the proper times to grip the hairs as they are delivered by the feeding mechanism, substantially as set forth.

33. In a machine for plucking hairs from pelts, the combination of the rotary plucking-head journaled within a yoke pivoted to the frame, the gripping-jaws carried by said head, the cam for opening said jaws, the shaft on which said cam is secured, a lever rigidly secured at one end to said shaft, and an adjustable link pivoted to the frame and to the other end of said lever, substantially as set forth.

In testimony whereof I affix my signature in presence of two witnesses.

DOLPHAS D. PALMER.

Witnesses:
F. W. SMITH, Jr.,
M. I. LONGDEN.